Dec. 11, 1923.

M. C. KESSLER

GAS ENGINE

Original Filed March 13, 1915    5 Sheets-Sheet 3

1,477,362

Dec. 11, 1923.

M. C. KESSLER

GAS ENGINE

Original Filed March 13, 1915    5 Sheets-Sheet 5

1,477,362

Patented Dec. 11, 1923.

1,477,362

UNITED STATES PATENT OFFICE.

MARTIN C. KESSLER, OF DETROIT, MICHIGAN, ASSIGNOR TO THE KESSLER MOTOR COMPANY, OF DENVER, COLORADO, A CORPORATION OF COLORADO.

GAS ENGINE.

Application filed March 13, 1915, Serial No. 14,104. Renewed July 24, 1923.

*To all whom it may concern:*

Be it known that I, MARTIN C. KESSLER, a citizen of the United States, residing at Detroit, in the county of Wayne and State of Michigan, have invented certain new and useful Improvements in Gas Engines, of which the following is a specification.

My invention relates to an improvement in gas engines, and more particularly of the internal-combustion type.

The primary object is to provide a simple and efficient means for controlling the passage of an auxiliary supply of air, in addition to the regular normal intake.

This is accomplished through the medium of two moving elements, one of which may slide or reciprocate (and for which purpose the piston may be utilized), and the other of which may rotate; or through two elements, one of which might turn or rotate in a sleeve, and the sleeve could operate as the piston, so that this element may rotate, oscillate, travel in the same direction as its co-operative element, or it may travel in the opposite direction; and my present invention therefore comprises an explosion cylinder, a compression chamber, an air passage from one to the other, and two moving elements for the control of the air through the passage.

My invention further comprises means for operating these controlling elements in unison and at properly timed intervals.

The invention further consists in a lubricating system in which bearings operate in an air compression chamber, with means for dispensing the excess oil on said bearings back to the oil reservoir, said means being pressure from within said compression chamber.

In the accompanying drawings:—

Figures 3, 4, 5, 6, 7, 8, 9, 10, 11 and 12 are diagrammatic views illustrating different positions of the moving elements on either side of and with respect to the air passage;

Figures 13, 14, 15, 16 and 17 are similar views in which are illustrated different positions of the moving elements when the time of admission of air under pressure is varied;

Figures 21 and 22 are views illustrating multiple controlling elements which provide for more quickly transferring air both to the engine cylinder and the compression chamber;

Figure 27 is a view which corresponds with Figure 13, illustrating how air from two compartments or compression-chambers may be admitted to one cylinder.

The numerals 1, 1, represent the cylinders, of which there are six in the engine illustrated, although the invention obviously applies quite as well to either a lesser or greater number.

Fitted to the cylinders are the pistons 2, 2, which pistons constitute moving elements, or which I shall term "sliding elements." While any approved form of sliding element might be used, the one illustrated preferably comprises two heads spaced apart in order to permit free air circulation therebetween to assist in keeping it cool.

Figure 1:
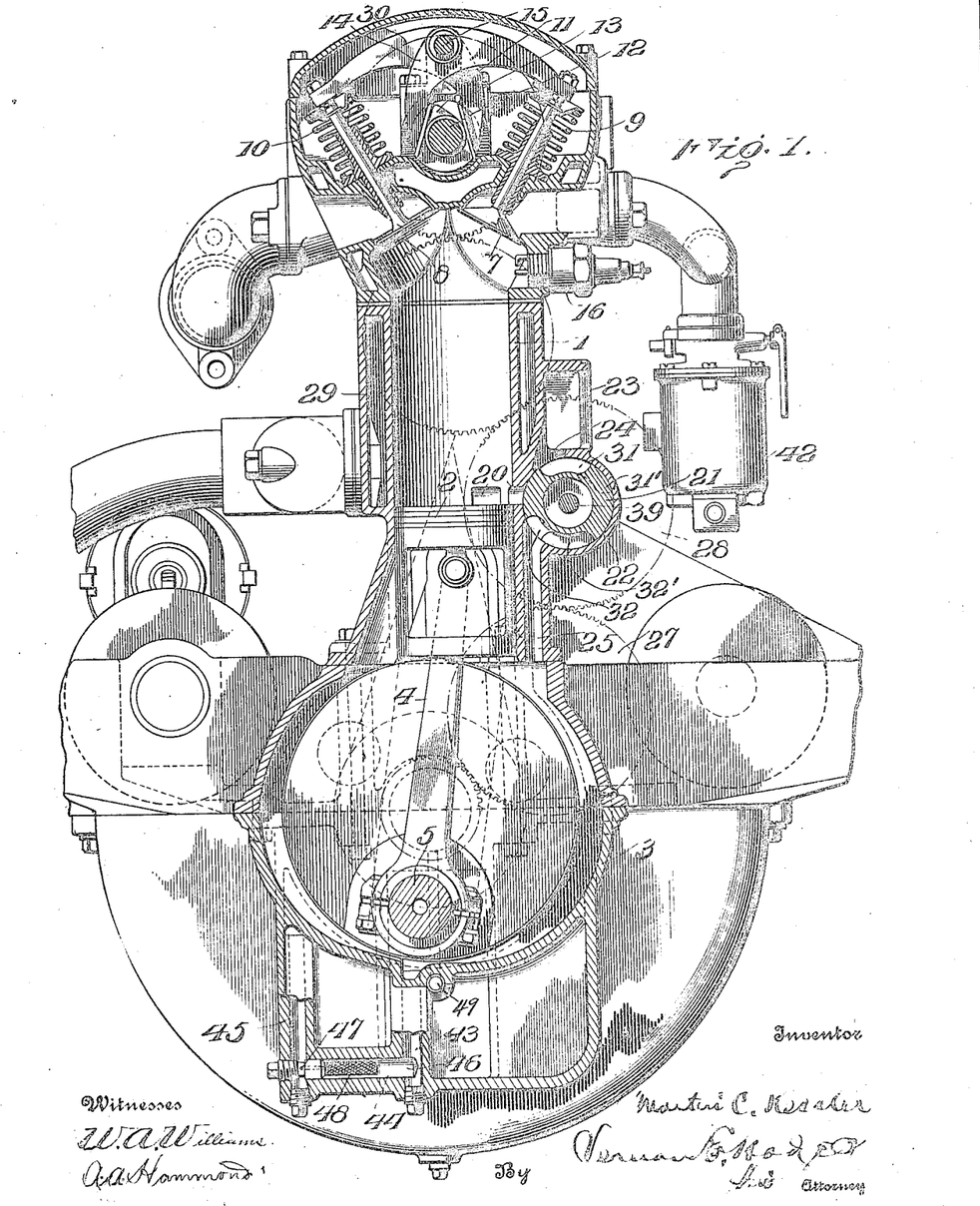
Figure 1 is a transverse vertical section.
Figure 2:
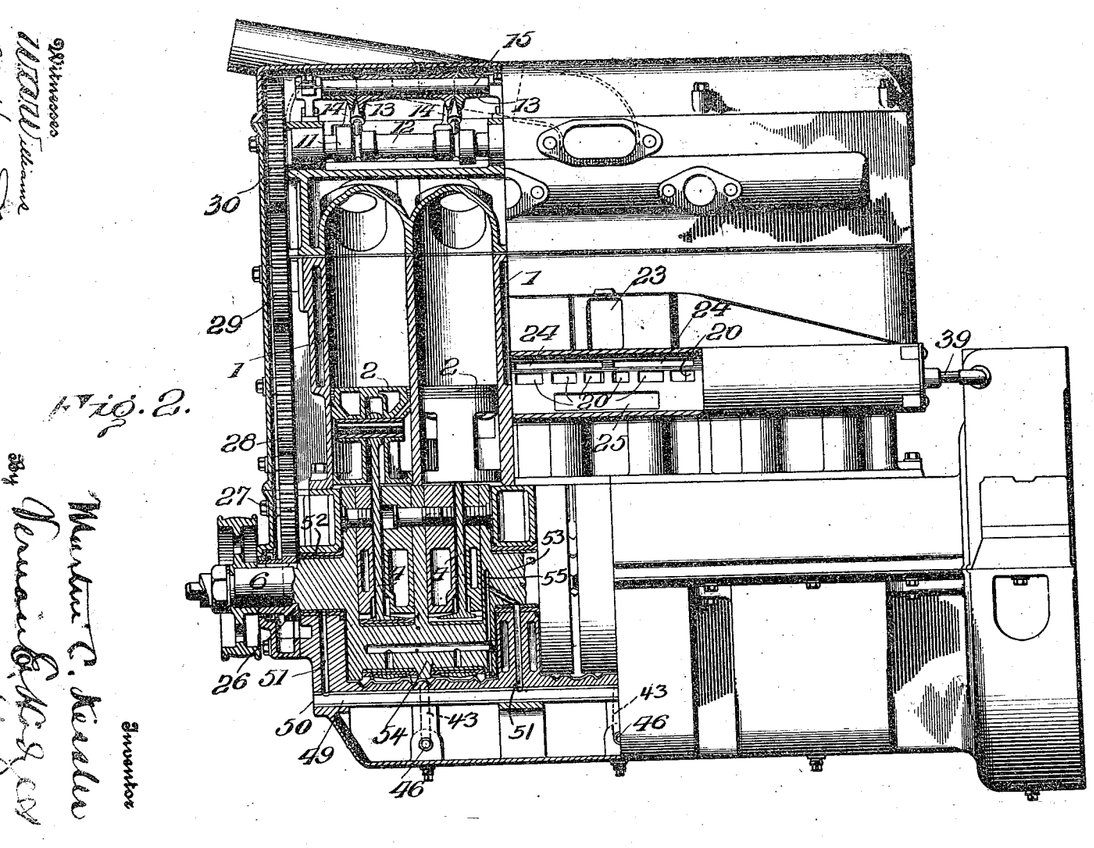
Figure 2 is a view in side elevation showing two cylinders and their connected mechanism in section.

The numerals 3, 3 indicate the compression-chambers, which, in the present illustration of the invention, take the form of crank-cases, but which will be generally referred to as "compression chambers." The connecting-rods 4, 4, extend from the cranks 5, 5, to the pistons or sliding elements in the usual manner; and in the present illustrated form of the invention, the cranks extend in pairs (as shown in Figure 2) from the crank-shaft 6, although this is but one of many forms the invention might take, and the cranks when thus arranged in pairs are arranged equidistantly as illustrated in the dotted lines in Figure 1.

Intake and exhaust-valves 7 and 8 respectively are located at the outer end of the cylinders, as illustrated in Figure 1, where their movements in one direction are controlled by the springs 9 and 10, while they are unseated at predetermined intervals by the cams 11, 11, on the cam-shaft 12 engaging the bell-crank levers 13 and 14 centrally located on the rod 15. The numeral 16 indicates the spark-plug screwed in at the outer end of the cylinders, and as close as convenient to the intake-valve 7.

The foregoing constitute the essential elements of the standard internal combustion engine, albeit in more or less modified and perfected form.

At the inner end of each cylinder an air-passage 20 is formed. There may be one or more or three as illustrated, and these air passages for each cylinder are arranged so they extend part way around it, as shown, for a better distribution of the air. This "air passage" 20, as it will be designated, is controlled by the sliding element or piston 2 on one side (the inside), and by the rotary element 21 on the other or outside.

The rotary element 21 is common to all cylinders, and is fitted to and rotates within a cylindrical valve-casing 22. Mounted above the valve-casing 22 is the manifold intake 23 with ports 24, 24, one of which is shown in Figure 1, leading into the valve-casing 22, and controlled by the rotary element 21, and a port 25 leads from the compression chamber 3 into the valve-casing 22 from below, the passage of air therethrough being also controlled by the rotary element.

This rotary element 21 is hollow, as illustrated, and is driven through the medium of gear 26 keyed on the crank-shaft 6, the intermediate-gear 27, and gear 28, in relation to which the rotary element is axially adjustable, whereby the operation of the latter is subject to variation under the control of the operator, as will be hereinafter more fully described. These gears 26 and 28 are geared in a ratio of two to one. Through these same gears, with the additional gears 29 and 30, the shaft 12 is rotated at the same speed as the rotary element 21.

On the surface of the rotary element at approximately opposite points, the air-ducts 31, 31' and 32, 32' are formed of different angular extent to secure proper timing of intercommunications for bringing the port 25 into communication with the air-passage 20, and the ports 24 or 25 into communication with the air-passage 20, and the ports 24 and 25 into communication with each other, see Figures 3 to 12, and also for establishing at certain times an inter-communication to the compression chamber through the air-passage 20 of a multiple of cylinders.

Figures 18, 19, 20:
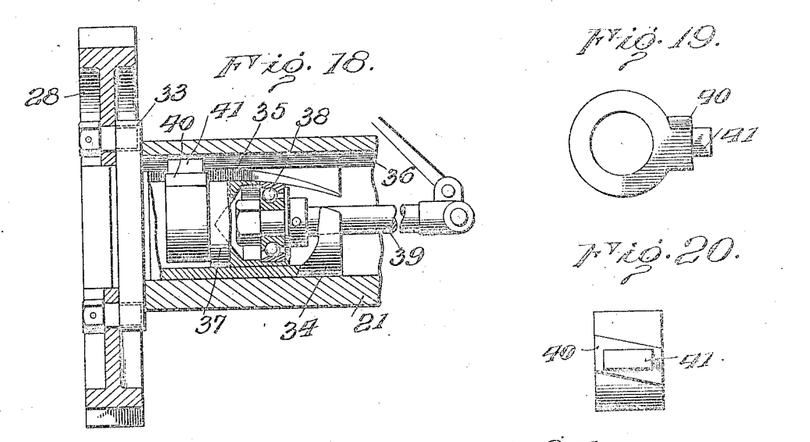
Figure 18 is a section illustrating the mechanism for advancing the position of the rotary element.
Figures 19 and 20 are details of parts of the rotary element advancing mechanism.

While this rotary element has a positive, predetermined and continuous rotary action for the control of the air-passages between compression-chamber and cylinder, provision is made for axially shifting the rotary element. Various means might be employed for accomplishing this, and one of many means is illustrated in detail in Figure 18, in which the gear 28 is bolted to the flange 33 on the outer end of a hub 34, and this hub is fitted to the bore of the rotary element 21. The hub is provided with a spiral key-way 35 and the rotary element is provided with a straight key-way 36. A collar 37 preferably has a ball-bearing mounting 38 upon the end of rod 39, and this collar is provided with the two keys 40 and 41, the former of which is set diagonally as shown in Figure 20, and fits the spiral key-way 35, while the key 41 fits and moves in the straight key-way 36 in the driven rotary element 21. A rod 39 may be connected with the accelerator (not shown) and also to the throttle of the carburetor 42, which connections are not shown.

It will be understood that by moving the rod 39 endwise, in either direction, the rotary element 21 is turned axially with respect to its driving-gear wheel 28, due to the movement of the key 40 in the spiral key-way 35, and of the key 41 in the straight key-way 36 in the bore of the rotary element 21. The variation of the position of the rotary element varies the time of air admission, and in this way the auxiliary air supply to the cylinders is controlled. In the normal running of the engine no compression from the crank case need be admitted to the cylinder as illustrated in Figs. 3 to 12 inclusive, hence air passage 20 is kept closed, but when the timing is advanced or changed, the compression from the crank case is utilized in the cylinder as in Figs. 13 to 22.

In order to get a comprehensive view of the operation, let us now refer to Figures 3 to 12, inclusive:—

Figure 3:
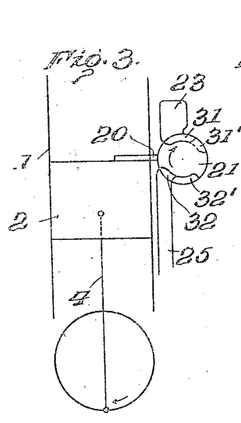

Figure 3 shows the parts approximately in the same position as illustrated in Figure 1. The sliding element 2 is at the end of its intake stroke, and the air-passage 20, while open at one side, is closed at the other by the rotary element.

Figures 4, 5:
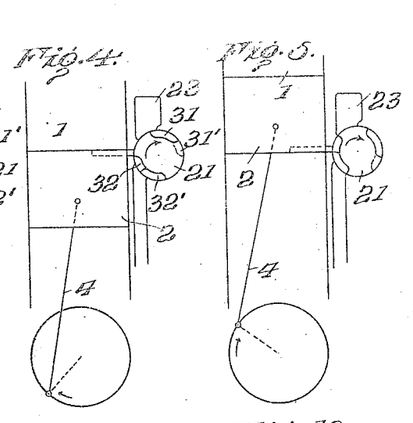

In Figure 4, the crank has made an eighth of a revolution, and the sliding element 2 has traveled sufficiently far on its compression stroke to have closed the air-inlet 20, and the rotary element has made a partial turn thus showing the air-passage closed at both ends by the sliding and rotary elements respectively, no air being admitted from the compression-chamber into the cylinder.

In Figure 5, the crank has made a quarter-revolution, and the sliding or reciprocating element is still closing the air-passage while the ducts 32 are connecting the intake 23 with the port 25 to the compression-chamber.

Figure 6:
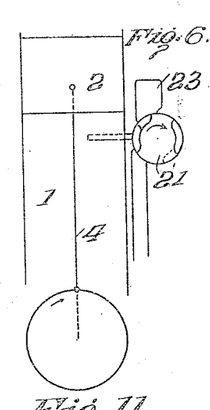

In Figure 6, the crank has made another eighth turn and the sliding or reciprocating element has completed its outstroke, having uncovered the air passage 20 with the intake 23, port 25, and air-passage 20 all in communication, creating a rapid restoration of atmospheric pressure in the compression-chamber, and overcoming the vacuum created by the outstroke of the sliding or reciprocating element.

In Figure 7, the crank has made another eighth revolution, and the sliding or reciprocating element has again closed the air-passage 20 on the inside, the rotary element 21 has closed the port 25, and the air thus trapped or imprisoned in the compression-chamber is from now on subjected to the compression resulting from the continued instroke of the sliding or reciprocating element. This compression, of course, results from the explosive stroke of the engine.

Figures 8, 9, 10:
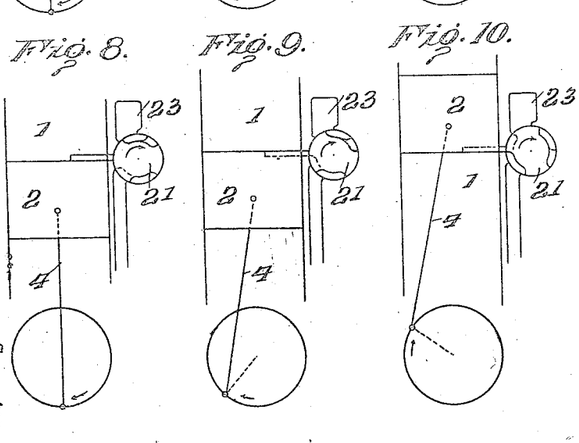

Figure 8 shows the position of the parts at the conclusion of the explosive stroke when the air in the compression-chamber has reached its maximum compression, and the sliding or reciprocating element is about to make its outstroke to expel the burnt gases from the cylinder, the parts corresponding to the position shown in Figure 3.

Figure 9 illustrates the position after the crank has made an eighth revolution, and the parts are all as illustrated in Figure 4. This would be the position in case of multiple cylinders which receive compressed air from the same source as others; in other words, where two or more cylinders receive air under pressure and the controlling elements provide for the passage of air through the air-passage 20 of but one cylinder at a time.

Figure 10 shows the position after another quarter-revolution of the crank-shaft has been made, and just as illustrated in Figure 5. This figure shows the admission of air to compression-chamber in case of multiple cylinder which has a compression chamber common to both cylinders.

Figure 11:
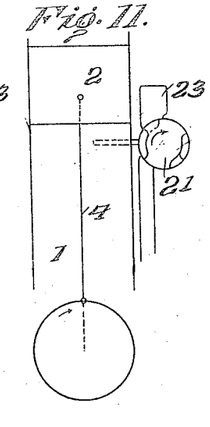

Figure 11 shows the air being again admitted to the compression-chamber from the manifold intake 23 of a multiple of cylinders.

Figure 12:
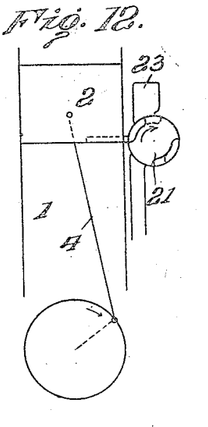

In Figure 12 the admission of air to the compression-chamber is again cut off by the same controlling elements which control the air from the compression-chamber to the engine-cylinder, in other words controlled by the same element which controls the air-passage 20.

Coming now to Figures 13 to 17, we have illustrated the possibilities resulting from varying the time of admission of the volume of air under pressure through the air-passage 20 into the cylinder above the piston, and also the varying of time of admission of air to compression-chamber by the same controlling elements which control the air under pressure, all of which is accomplished through the medium of the rod 39, and its connected parts, namely the hub with the spiral key-way, and the two keys, one operating in the spiral key-way and the other in the straight key-way in the bore of the rotary element 21.

Figures 12, 13, 14:
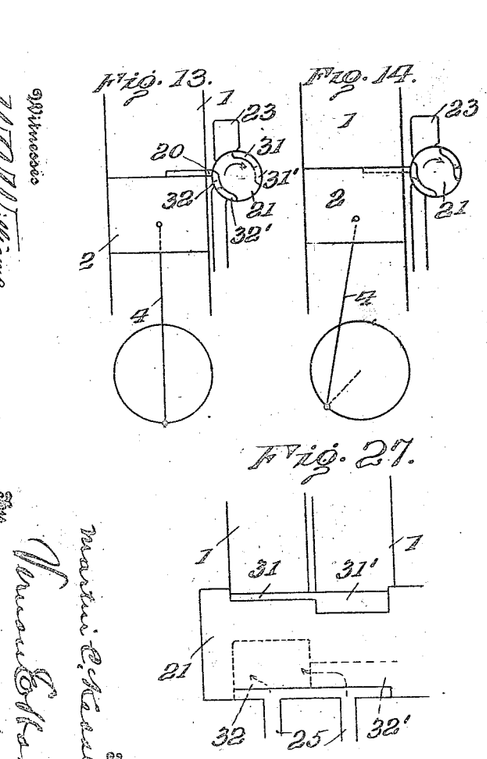

In Figure 13, the sliding or reciprocating element has just completed its instroke. The air which has been compressed in the compression-chamber is expelled under compression by its release by the two moving elements 2 and 21 into the inner end of the cylinder just over the piston.

In Figure 14, the crank has made an eighth turn and the sliding or reciprocating element has closed the air-passage 20, and the air confined in the cylinder is being compressed.

Figures 15, 16, 17, 21, 22:
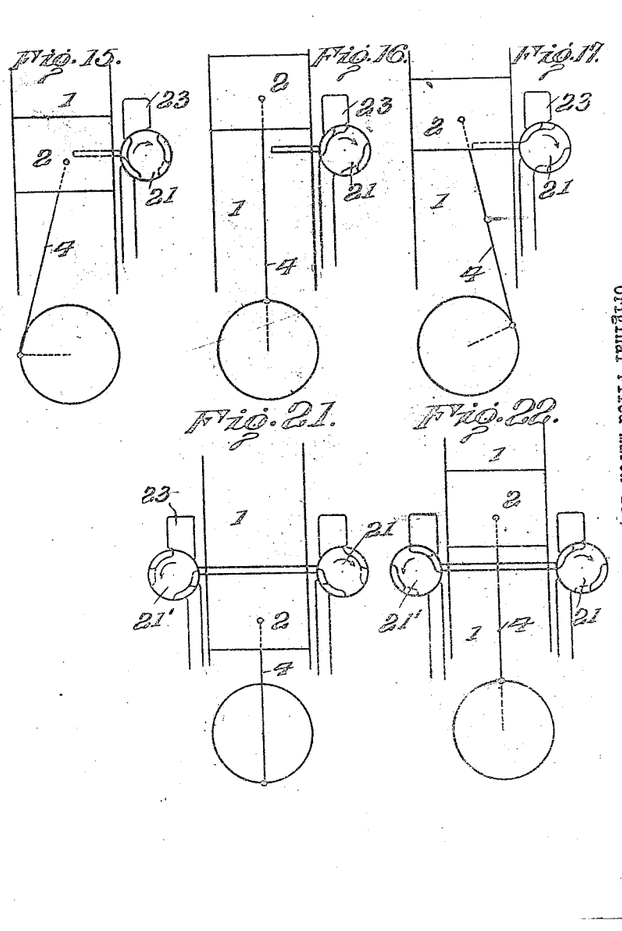

In Figure 15, the crank has made an eighth revolution, the compression in the cylinder is continuing, and air is being admitted into the compression-chamber from the manifold intake 23 through duct 32 and the port 25, they being in communication.

In Figure 16, the sliding or reciprocating element has completed its outstroke. The air in the outer end of the cylinder is compressed, and the explosion is about to take place, and air is being drawn in from the manifold intake 23 through duct 32 into the air-passage 20.

In Figure 17, the crank has made another eighth revolution. The sliding or reciprocating element has closed the air-passage 20, and the port 25 has been closed by the rotary element, and the air thus confined in the compression-chamber is undergoing compression.

Thus the air from the compression-chamber for augmenting the normal intake is wholly within the control of the operator, and is accomplished by the degree of advance or axial adjustment of the rotary element, and the stratified condition of air and gas resulting from the intake of gas at one end of the cylinder and the subsequent intake of air at the other end, and the compression of one beneath the other, which gives the effect of an air-cushion over the head of the piston upon which the explosion takes place.

Figures 21 and 22 simply illustrate the possibility of using multiple controlling elements in order to more quickly transfer the air through the air-passages, of which there will be two in this instance, both to the engine cylinder and to the compression-chamber.

Figure 23:
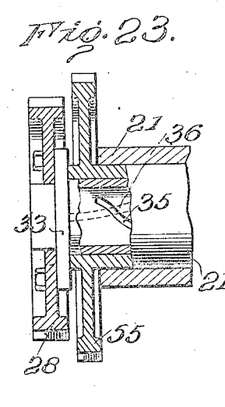
Figure 23 is a view partly in section showing the means whereby the two rotary elements are simultaneously controlled.
Figure 24:
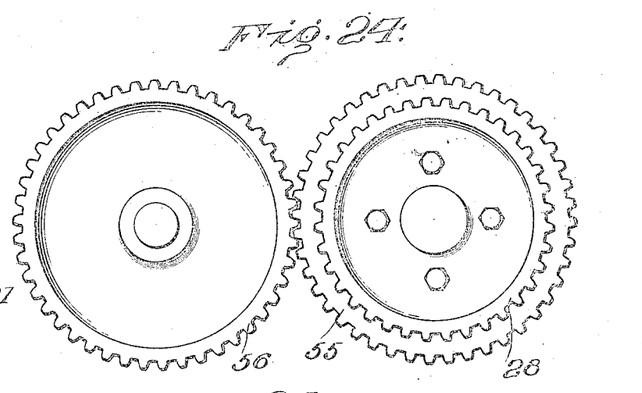
Figure 24 is a front view enlarged of the gears for operating the two rotaries in unison.
Figure 25:
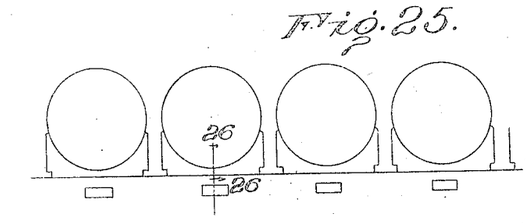
Figure 25 is a diagrammatic view showing four cylinders in plan in their relation to the rotary element.

In Figures 23 and 24, means is illustrated for transmitting motion to the second rotary element illustrated in Figures 21 and 22, for in addition to the gear-wheel 28 on the rotary element 21, there is a gear-wheel 55 which meshes with and drives gear 56 keyed to the rotary element 21′ on the other side.

Figure 27 shows the parts in a position corresponding to Figure 13, the sliding or reciprocating element having just completed its instroke. The air which has been compressed in the compression-chamber or chambers is expelled under compression by its release by the two elements 2 and 21 into the inner end of the cylinder just over the piston, and air is being admitted from two compartments or compression-chambers to one cylinder, namely the cylinder to the left, shown in Figure 27.

In like manner, it is possible to admit air to two compression-chambers at the same time, as when the parts are substantially as illustrated in Figure 6, thereby giving double the volume of air. In this use, the two pistons are traveling together so that when the passage 20 is opened by one, it is also opened by the other, but while the controlling element determines whether the air is to be admitted to but one cylinder, by the same controlling means it is determined whether air may be admitted to two compression-chambers.

Figure 26:
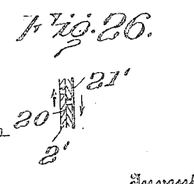
Figure 26 is an illustration to show that the controlled passage might be between the two contacting parts.

This principle of control would still be operative within certain limitations regardless of the length of space between the moving elements; in other words, the two elements might even rub against each other, as illustrated in Figure 26, one being designated by the numeral 2′ and the other by the numeral 21′, yet the space between them becomes or still remains the controlled passage between the compression-chamber and the engine-cylinder.

I do not limit myself to any mechanical mechanism for controlling the air-passages, nor do I limit myself to the speed or timing of the moving elements in any way.

A lubricating system is provided for the bearings and cranks of the moving parts, as shown in Figures 1 and 2. A well 43 leads from the lowest point of the cranks, and a horizontal channel 44 leads from this to a return passage 45, and in the channel 44 a removable tube 46 is inserted for controlling the outlet of oil or lubricant by its escape through an outlet 47, which is of greater size than the inlets 48, of which there may be many.

The lubricant is forced down through the well 43, thence through a plurality of smaller holes 48, by which it is strained, so to speak, whence it escapes through outlet 47 and ascends through the passage 45 back into the oil sump.

Circulation of oil through passages 43, 44 and 45 is caused by compression created by the instrokes of the pistons removing excess oil from the compression-chamber to the oil-sump. It will be understood that the oil is supplied to the bearings through passages 49 and 51 through any suitable means.

In the engine illustrated, I have shown one of these removable clean-out tubes 46 for each set of two cylinders.

Oil is supplied to the engine through the tube 49, and from this tube, channels 51 extend to the crank-shaft bearings, and the cranks themselves splash the oil to the other moving parts, as is well understood, and the gears and moving parts outside of the cylinders are kept lubricated from above, as is customary.

It is understood that oil is supplied to the bearings by any suitable means, and as the oil is thrown off and accumulates in the well shown it will readily be seen that the pressure in the crank-case, ranging up to approximately twenty-five pounds on the inward strokes of the piston, will force the oil from the crank chamber to a suitable reservoir, which may not be under pressure, but from which the oil is supplied to the bearings. The fact that the suction in the crank chamber causes but little vacuum to supply the crank chamber piston displacement, and as the total time while this oil release is under vacuum is but a small percentage both as to time and pressure, which can readily be understood, keeps this chamber free from the accumulation of oil. And while it is supposed that the release oil passage is not in direct connection with the oil in the supply reservoir, yet this system has been successfully operated with an open oil relief directly connected with the bottom of said oil reservoir with perfect crank-case oil scavenging.

This is not to be questioned because I am using this system on all of my motors, one of which has been in constant use for six years in an automobile.

It is understood that the crank chamber and oil reservoir are separate compartments connected only by said oil relief.

I claim:—

1. In a four-cycle explosive engine which has main valves and compression chamber valve two cylinders, two pistons reciprocating in one direction at the same time for the purpose of creating compression in a compression chamber which is common to the ends of both of said pistons, a by-pass leading from said compression chamber to the opposite end of one of said pistons, a by-pass to admit air to said compression chamber, and means for controlling all of said by-passes by said compression chamber valve which may be advanced or retarded while in operation without affecting the timing of said main valves.

2. In a four-cycle explosive engine which has main valves and compression chamber valve two cylinders, two pistons reciprocating in one direction at the same time for the purpose of creating compression in a compression chamber which is common to the ends of both of said pistons, a by-pass leading from said compression chamber to the opposite ends of said pistons, said compression chamber valve alternately opening and then closing said by-pass leading from the compression chamber end of said two pistons to the opposite end of either one of said pistons, a by-pass to admit air to said compression chamber, and means for effecting the control of all of said by-passes by the compression chamber valve which may be advanced or retarded while in operation without affecting the timing of said main valves.

3. In a four-cycle explosive engine which has main valves and a compression chamber valve two cylinders, two pistons reciprocating in one direction at the same time for the purpose of creating compression in a compression chamber which is common to the ends of both of said pistons, a by-pass leading from said compression chamber to the opposite end of either one of said pistons alternately, a by-pass to admit air to said compression chamber, and means for partly controlling all of said by-passes by said compression chamber valve which may be advanced or retarded while in operation without affecting the timing of said main valves.

4. In a four-cycle explosive engine which has main valves and a compression chamber valve two cylinders, two pistons reciprocating in one direction at the same time for the purpose of creating compression in a compression chamber which is common to the ends of both of said pistons, a by-pass leading from said compression chamber to the opposite end of one of said pistons, a by-pass to admit air to said compression chamber, means for controlling all of said by-passes by the combination of said piston or pistons and said compression chamber valve, and means for controlling the admission of air to said compression chamber independently of said piston or pistons.

5. In a four-cycle explosive engine which has main valves and a compression chamber valve two cylinders, two pistons reciprocating in one direction at the same time for the purpose of creating compression in a compression chamber which is common to the ends of both of said pistons, a by-pass leading from said compression chamber to the opposite ends of said pistons, said compression chamber valve alternately opening and then closing said by-pass leading from the compression chamber end of said two pistons to the opposite end of either one of said pistons, a by-pass to admit air to said compression chamber, means for effecting the control of all of said by-passes by the combination of said piston or pistons and said compression chamber valve, and further means for controlling the admission of air to said compression chamber by said compression chamber valves independently of said piston or pistons.

6. In a four-cycle explosive engine which has main valves and a compression chamber valve two cylinders, two pistons reciprocating in one direction at the same time for the purpose of creating compression in a compression chamber which is common to the ends of both of said pistons, a by-pass leading from said compression chamber to the opposite end of either one of said pistons alternately, a by-pass to admit air to said compression chamber, means for controlling all of said by-passes by the combination of said piston or pistons and said compression chamber valve, and controllable means for varying the time of admission of air to said compression chamber independently of said piston or pistons and without affecting the timing of said main valves.

7. In an explosive gas-engine, a plurality of cylinders, a compression-chamber, air-passages into the cylinders, a multiple of intakes to the compression-chamber, and a rotary element which controls the intakes to the compression-chamber.

8. In an explosive gas-engine, a plurality of cylinders, a compression-chamber, air-passages into the cylinders, a multiple of intakes to the compression-chamber, and two rotary elements for controlling the intakes to the compression-chamber.

9. An explosive gas-engine having a plurality of cylinders, each having an air-passage thereinto, a plurality of compression-chambers, and two moving elements for each air-passage, one of which is capable of adjustment to cause air from more than one compression-chamber to be admitted to a cylinder, and also for admitting air into more than one compression-chamber at the same time.

10. An explosive gas engine, having a plurality of cylinders, each having air passages thereinto from a compression-chamber, in connection with a plurality of moving elements for the control of said air passages, two of which are rotary elements capable of variable adjustment to cause air from said common compression-chamber to be admitted through said air passages to a cylinder, and also for admitting air into said common compression-chamber.

11. In an explosive engine, the combination with cylinder, piston, crank-shaft, compression-chamber in communication with the cylinder, and two rotaries constructed and adapted to admit air to the compression chamber and control its discharge therefrom to the cylinder.

12. In an explosive gas engine, the combination of a cylinder, having an air port, a compression-chamber, having an air port, a rotary element having an air port and a port connecting all or part of said ports at intervals, controlled by said rotary element.

In testimony whereof I affix my signature, in the presence of two witnesses.

MARTIN C. KESSLER.

Witnesses:
HENRY G. SCHUBERT,
MICHAEL S. DONOVAN.